United States Patent [19]
Spizzo

[11] 3,980,988
[45] Sept. 14, 1976

[54] ALARM SYSTEM FOR VEHICLE SHOULDER HARNESS

[76] Inventor: Anthony M. Spizzo, 1824 S. 48th Court, Cicero, Ill. 60650

[22] Filed: Nov. 27, 1974

[21] Appl. No.: 527,709

[52] U.S. Cl. .............................. 340/52 E; 340/259; 340/279; 242/148; 200/61.18; 200/61.58 B
[51] Int. Cl.² .................. B60R 21/10; G08B 21/00
[58] Field of Search ................ 340/52 E, 278, 279, 340/259; 307/10 SB; 297/384, 385, 389; 280/150 SB; 180/82 C, 99; 128/75, 132, 133, 134, 135; 116/67 R; 242/147, 148; 200/61.18, 153 F, 153 W, 61.58 B, DIG. 2

[56] References Cited
UNITED STATES PATENTS

| | | | |
|---|---|---|---|
| 2,681,955 | 6/1954 | Davis | 200/52 |
| 2,948,076 | 8/1960 | Patricello | 200/61.18 |
| 3,185,246 | 5/1965 | Maurer | 180/82 |
| 3,253,269 | 5/1966 | Ratti | 340/259 |
| 3,281,818 | 10/1966 | Morgan et al. | 340/278 |
| 3,582,935 | 6/1971 | Verhaegle | 340/279 |
| 3,638,647 | 2/1972 | Creelman | 128/133 |
| 3,804,192 | 4/1974 | Takada | 340/52 E |
| 3,831,140 | 8/1974 | Anderson, Jr. et al. | 340/52 E |
| 3,838,235 | 9/1974 | St. Germain | 200/61.18 |

Primary Examiner—Donald J. Yusko
Assistant Examiner—Joseph E. Nowicki
Attorney, Agent, or Firm—Rummler & Snow

[57] ABSTRACT

An alarm attached to the shoulder harness seat belt of an automobile wherein to sound an audible alarm when any forward pressure is exerted on the belt.

2 Claims, 5 Drawing Figures

U.S. Patent  Sept. 14, 1976  3,980,988
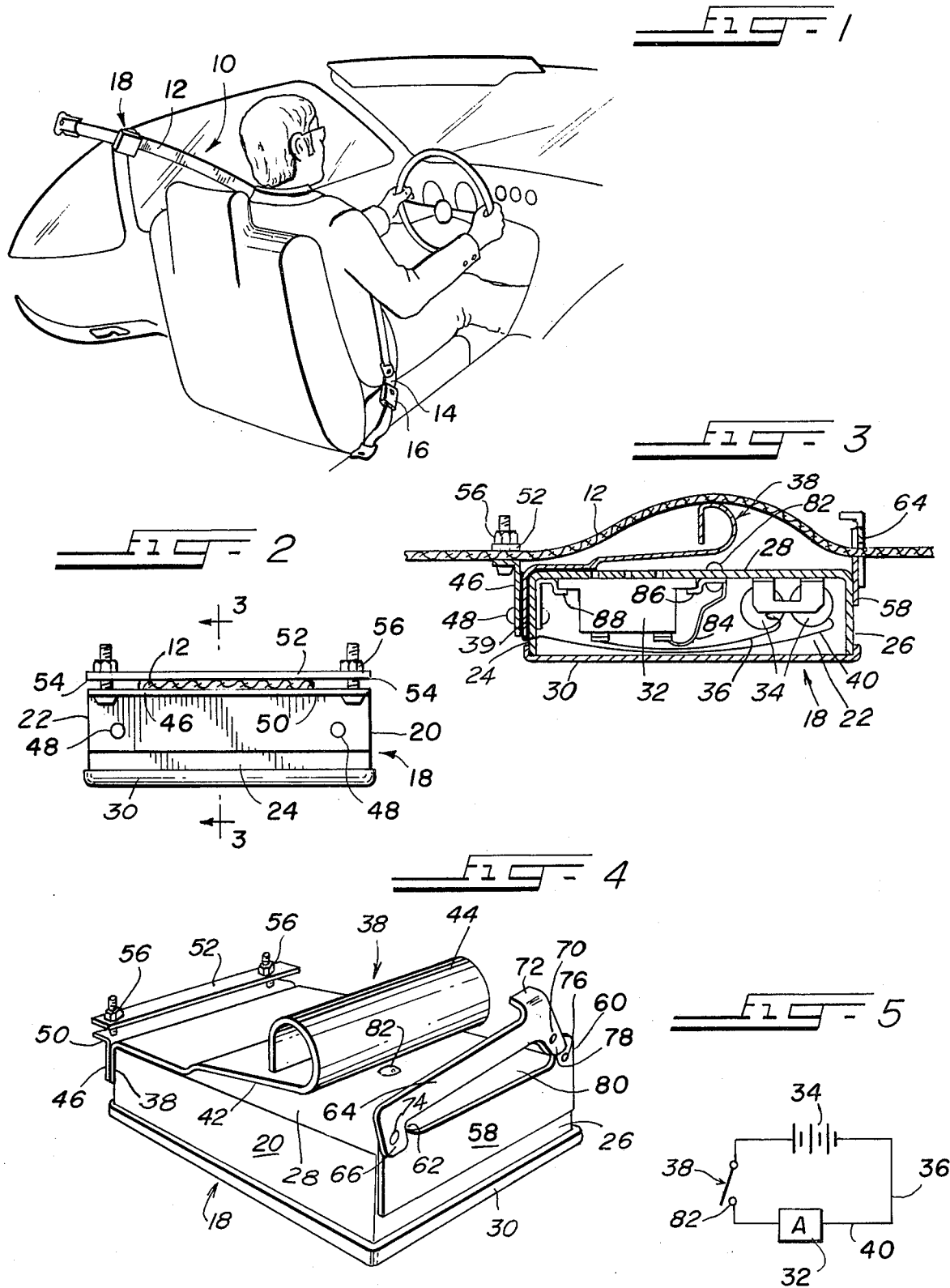

ALARM SYSTEM FOR VEHICLE SHOULDER HARNESS

BACKGROUND OF THE INVENTION

When driving long distances in an automobile, the driver tends to get eye strain causing him to get drowsy watching the roadway and hence he falls asleep. When he becomes drowsy, he normally will tend to lean forward. By so doing, the shoulder strap will have pressure exerted against it and hold the driver from slumping forward, but only momentary drowsiness can cause a high speed vehicle to crash. Thus the present invention was conceived to alert a driver of his condition and shock him into an alert state and thereby avert a serious accident.

SUMMARY OF THE INVENTION

A relatively small compact alarm anchored to the shoulder strap of a shoulder harness in an automobile which produces an audible alarm when used by a driver and forward pressure of the torso of the driver is exerted thereagainst.

BRIEF DESCRIPTION OF THE DRAWINGS

FIG. 1 is a rear perspective view of a driver, seat and the alarm of the present invention;

FIG. 2 is an end elevational view with parts in section;

FIG. 3 is a cross-sectional view taken on the lines 3—3 of FIG. 2 with parts shown in full lines;

FIG. 4 is a perspective of the alarm unit detached from the shoulder strap; and

FIG. 5 is a circuit diagram.

DESCRIPTION OF THE PREFERRED EMBODIMENT

As seen in FIG. 1, the conventional shoulder harness 10 comprises a web 12 having a slide latch plate 14 at one end for attachment and detachment from the usual latch or buckle member 16. The other end of the web 12 is anchored to a structural member such as the roof structure (not shown).

Adjacent the point of anchorage of the web to the roof structure, the alarm 18 of the present invention is secured to the web 12.

The alarm comprises a compact box structure having side walls 20–22, end walls 24–26 and a top wall 28. The lower end of the box is open ended and is provided with a closure 30. The box may be constructed of metal or plastic.

Anchored within the housing is a vibrating buzzer 32 electrically connected to a pair of long life flashlight batteries 34 by lead 36 extending from the positive side of the batteries arranged in the usual side-by-side manner to one side of the buzzer. The buzzer 32 is of a conventional type.

A switch 38 is insulatingly positioned on the top wall 28 and is provided with a depending flange 39 which is connected to the negative side of the batteries 34 by lead 40. It is to be noted from FIG. 4 that the switchplate 38 has the same width as the top 28 and the right hand end 42, as seen in FIG. 4, is canted upwardly and away from the top 28 while the free end is curled backwardly over itself or to the left to form a loop 44. The switchplate is anchored to the end wall 24 by rivets 48 through flange 39.

The rear end of the box is provided with a plate 46 secured to end wall 24 by the rivets 48 with the free end 50 bent at right angles and provided with apertures adjacent each end. An elongated clamping plate 52 lies over the portion 50 and is provided with apertures aligned with the apertures in portion 50 for the reception of headed screws 54 and nuts 56 whereby to receive a portion of the web 12 between the portion 50 and plate 52 adjacent the point of attachment to the roof of the car and the screw and nut (54–56) are tightened. Thus the box 18 will be positioned to be stationary on the web 12.

The opposite end wall 26 of the box 18 is provided with a plate 58 which is welded on the outer face of wall 26 and partially extends upwardly above the wall 26. The upper edge of the plate 58 is provided with spaced ears 60–62. A guiding lever 64 is provided with downwardly extending ears 66–70 and a handle means 72 extends upwardly from the top edge of lever 64. The ears 62 and 66 are provided with aligned apertures for the reception of a pivot rivet 74 while the ear 60 is provided with an inwardly extending detent 76 which is intended to seat in a small depression 78 in ear 70. Thus an elongated opening 80 is formed.

When the portion of the web 12 forward of the clamping bar 52 is placed over the switchplate 42–44, and the bar 64 is opened above its pivot, the web is placed on the upper edge of plate 58 and the bar 64 closed. Thus the web is freely movable in the opening 80.

When the locking plate 14 is inserted in the latch 16 over the shoulder and body of the driver of an automobile, the tension on the web 12 is not normally sufficient to close the switchblade 38. However, should the driver slump forward by dozing or sleeping, this action will tighten the tension on the web and the switchblade will close against the contact 82 causing the alarm to sound and awaken the driver.

The rivet contact 82 is electrically connected to the alarm 32 by the connector 84 which also has a right angled bracket 86 embodied therein to support the alarm. The rivet 82 also secures the connector 84 to the top wall 28. The other end of the alarm is supported by a similar right angled bracket 88 which is secured to the box 18 by rivet 48.

Obviously the switchblade is insulated from the top and side wall as shown and anchored to the end wall 24 by the rivets 48, and the rivet contact 86 is positioned below the right hand end of the switchplate 42, as viewed in the drawings.

Thus a complete electrical circuit has been formed when the switchplate makes contact with the rivet-contact, causing the alarm to be energized and emits a loud sound to alert the driver and bring him back to full consciousness.

It should be obvious that if desired, the alarm system could be hooked up to the car battery and would work just as efficiently as by use of long life flashlite batteries.

Although but one specific embodiment of this invention is herein shown and described, it will be understood that details of the construction shown may be altered or omitted without departing from the spirit of the invention as defined by the following claims.

I claim:

1. An alarm system secured to a safety shoulder harness for drivers of vehicles comprising a web having two ends and latching means for the ends of said web in combination with a housing having a top wall, side and end walls, an alarm affixed to said top wall interiorly of said housing, a source of direct current, a movable switch lever secured at one end to said top wall exteriorally of said housing and electrically connected to said source and having a free end, a stationary contact on said top wall cooperatively associated with said switch lever and electrically connected to said alarm, means on one end wall of said housing for removably securing said housing to said web and guide means on the other end wall of said housing forming a guideway for said web, said switch lever canted upwardly towards said guide means and the free end of the lever bent upwardly and rearwardly to form a loop, said web between said securing means and said guide means being loosely placed over said switch lever, whereby said web lies aove said top wall, and when said web is tightened, it will cause the switch lever to engage the stationary contact to set off the alarm.

2. The device of claim 1 wherein the guide means for said web is a removable clamp loosely securing said web whereby said web is freely shiftable therein.

* * * * *